United States Patent
Gibson et al.

(10) Patent No.: US 9,925,972 B2
(45) Date of Patent: Mar. 27, 2018

(54) METHOD AND SYSTEM FOR REDUCING DRIVELINE NVH

(71) Applicant: Ford Global Technnologies, LLC, Dearborn, MI (US)

(72) Inventors: Alex O'Connor Gibson, Ann Arbor, MI (US); Yuji Fujii, Ann Arbor, MI (US); Felix Nedorezov, Rochester Hills, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 676 days.

(21) Appl. No.: 13/923,758

(22) Filed: Jun. 21, 2013

(65) Prior Publication Data
US 2014/0378273 A1 Dec. 25, 2014

(51) Int. Cl.
*B60W 20/00* (2016.01)
*B60W 10/02* (2006.01)
*B60W 10/08* (2006.01)
*B60W 30/20* (2006.01)
*B60W 20/17* (2016.01)
*F16H 61/14* (2006.01)
*B60W 50/00* (2006.01)

(52) U.S. Cl.
CPC ............ *B60W 20/00* (2013.01); *B60W 10/02* (2013.01); *B60W 10/08* (2013.01); *B60W 20/17* (2016.01); *B60W 30/20* (2013.01); *B60W 2050/0054* (2013.01); *B60W 2050/0056* (2013.01); *Y10S 903/902* (2013.01); *Y10T 477/26* (2015.01)

(58) Field of Classification Search
None
See application file for complete search history.

(56) References Cited

U.S. PATENT DOCUMENTS

| 5,190,130 | A | 3/1993 | Thomas et al. |
| 5,512,204 | A | 4/1996 | Aarts et al. |
| 6,138,629 | A | 10/2000 | Masberg et al. |
| 6,314,342 | B1 * | 11/2001 | Kramer ............... B60G 17/0195 180/197 |
| 6,405,701 | B1 * | 6/2002 | Masberg ................ B60K 6/485 123/192.1 |

(Continued)

FOREIGN PATENT DOCUMENTS

CN 101100188 A 1/2008
FR 2922847 B1 11/2009

(Continued)

OTHER PUBLICATIONS

Anonymous, "Beam Drive Axle Housing Construction," IPCOM No. 000143628, Published Dec. 1, 2006, 3 pages.

(Continued)

*Primary Examiner* — Robert W Hodge
*Assistant Examiner* — Ryan P Dodd
(74) *Attorney, Agent, or Firm* — David Kelley; McCoy Russell LLP

(57) ABSTRACT

A method and a system for reducing driveline speed oscillations related to a driveline resonance frequency are described. Driveline speed oscillations may be reduced via slipping a driveline clutch or adjusting torque of a driveline motor/generator. The method and system may be activated during select vehicle operating conditions.

10 Claims, 4 Drawing Sheets

(56) References Cited

U.S. PATENT DOCUMENTS

Figure 1:
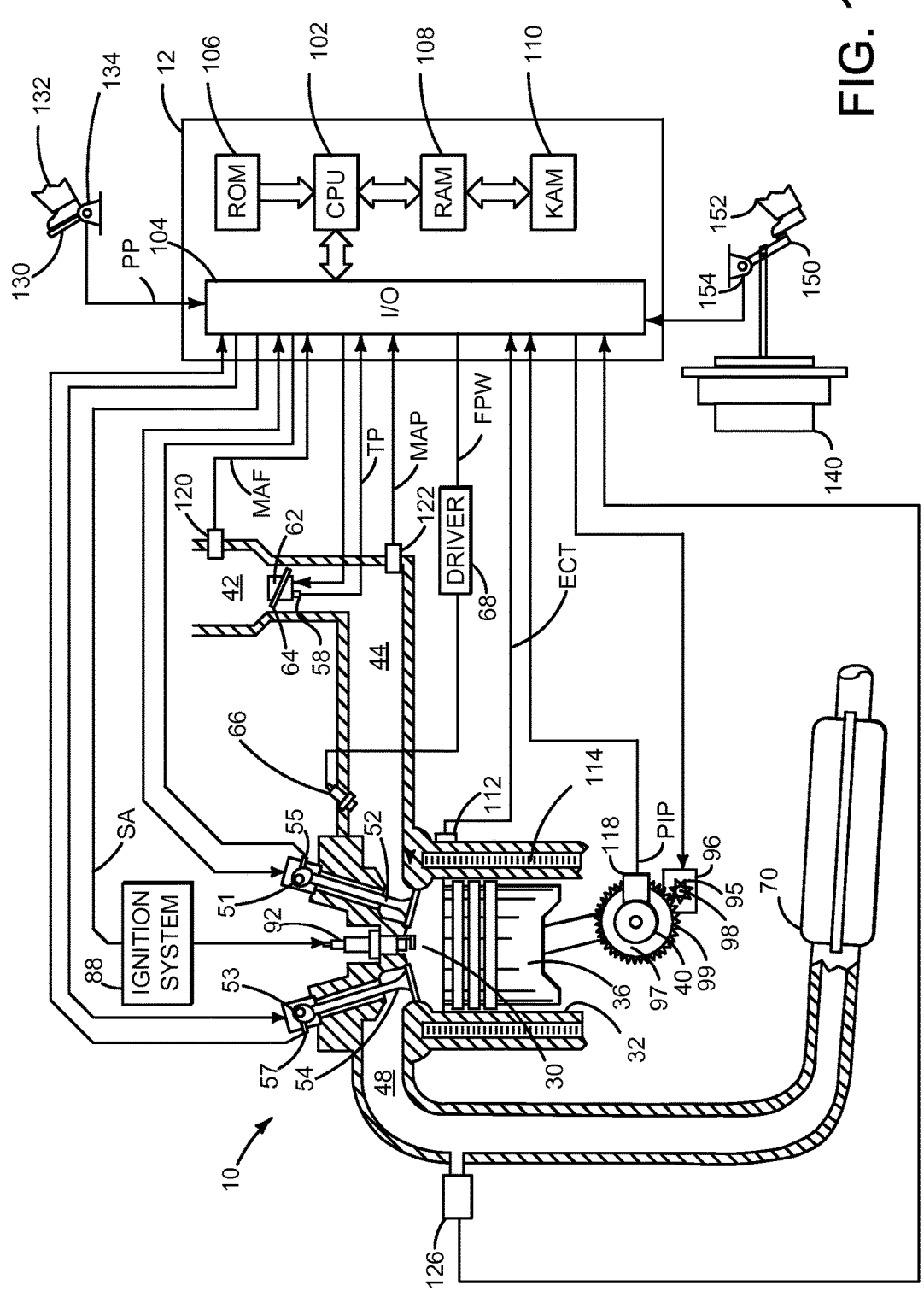

| | | | |
|---|---|---|---|
| 7,396,314 B2 | 7/2008 | Winkel et al. | |
| 7,518,344 B2 | 4/2009 | Sihler | |
| 9,174,645 B2* | 11/2015 | Beechie | B60W 10/023 |
| 2002/0190683 A1* | 12/2002 | Karikomi | G05D 19/02 |
| | | | 318/632 |
| 2005/0189192 A1* | 9/2005 | Serebrennikov | B60W 30/20 |
| | | | 192/30 V |
| 2009/0233766 A1* | 9/2009 | Kadota | B60W 10/02 |
| | | | 477/176 |
| 2012/0078456 A1* | 3/2012 | Hakumura | B60L 3/003 |
| | | | 701/22 |
| 2012/0277943 A1 | 11/2012 | Kim | |
| 2013/0085634 A1* | 4/2013 | Jinbo | B60W 10/02 |
| | | | 701/22 |
| 2013/0296132 A1* | 11/2013 | Doering | B60K 6/48 |
| | | | 477/86 |
| 2014/0303823 A1* | 10/2014 | Nakanishi | B60K 6/48 |
| | | | 701/22 |

FOREIGN PATENT DOCUMENTS

| | | | | |
|---|---|---|---|---|
| JP | 2009220712 A | | 10/2009 | |
| JP | 2011020542 A | | 2/2011 | |
| WO | WO 2013061437 A1 * | | 5/2013 | B60K 6/48 |

OTHER PUBLICATIONS

Anonymous, "Face Hob Top land Radius," IPCOM No. 000171319, Published Jun. 4, 2008, 2 pages.

State Intellectual Property Office of the People's Republic of China, Office Action and Search Report Issued in Application No. 201410280253.9, dated Aug. 3, 2017, 9 pages. (Submitted with Partial Translation).

* cited by examiner

METHOD AND SYSTEM FOR REDUCING DRIVELINE NVH

FIELD

The present description relates to a method and system for reducing noise, vibration, and harshness (NVH) of a vehicle driveline. The method and system may be particularly suitable for vehicle drivelines that include a U-joint between output of a transmission and input to a rear wheel differential.

BACKGROUND AND SUMMARY

A vehicle driveline may include a universal joint (U-joint) between an output of a transmission and input to a differential to allow vertical motion between the transmission and the differential. The U-joint may be located between two driveshaft halves, one driveshaft half coupled to the transmission and the other driveshaft coupled to the differential. The U-joint and driveshaft halves may have a natural resonance frequency that is within the expected driveline rotational frequency range. If the driveline is rotated at its resonance frequency, the driveline may begin to oscillate and transfer motion to the vehicle chassis. Therefore, it would be desirable to avoid the driveline's resonance frequency, but avoiding the drivelines natural frequency may not be possible at all times. One way to reduce vehicle driveline oscillations may be to slip a torque converter lockup clutch when vehicle speed is within a specified vehicle speed range. However, slipping the torque converter lockup clutch may consume fuel and degrade clutch performance.

The inventors herein have recognized the above-mentioned issues and have developed a driveline operating method, comprising: adjusting torque of a generator in a driveline in response to a band pass filtered driveline speed in a first mode; and adjusting slip of a clutch in the driveline in response to the band pass filtered driveline speed in a second mode in response to a generator condition.

By adjusting torque output of a driveline motor/generator in response to a band pass filtered driveline speed, it may be possible to provide the technical result of limit vehicle NVH while improving vehicle fuel economy. In particular, it may be more efficient to cancel driveline speed oscillations when a driveline motor/generator has sufficient torque capacity to reduce the driveline speed oscillations. Further, when the driveline motor/generator is at a condition where it does not have capacity to reduce the driveline speed oscillation to less than a threshold speed oscillation, a driveline clutch may be commanded to slip to allow the vehicle to continue to operate at its present speed.

The present description may provide several advantages. In particular, the approach may reduce driveline speed oscillations during different driveline operating conditions. Further, the approach provides for selecting a driveline speed sensor that provides a higher resolution driveline speed so that compensation may be provided during varying driveline conditions. Additionally, by band pass filtering the driveline speed signal, it may be possible to provide compensation that cancels only driveline resonance frequencies.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 1 is a schematic diagram of an engine;

FIG. 2 shows an example vehicle and vehicle driveline configuration;

FIG. 3 shows example driveline resonance techniques; and

FIG. 4 shows a method compensating for driveline resonance.

DETAILED DESCRIPTION

The present description is related to controlling a vehicle powertrain. The vehicle may include an engine and disconnect clutch as is shown in FIGS. 1-2. Compensation for driveline resonance frequencies may be provided as shown in the vehicle operating sequence of FIG. 3. FIG. 4 shows a method for operating a vehicle driveline to reduce NVH related to driveline resonance frequencies.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter motor 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel into an intake port of cylinder 30, which is known to those skilled in the art as port fuel injection. Alternatively, fuel may be injected directly into a cylinder, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
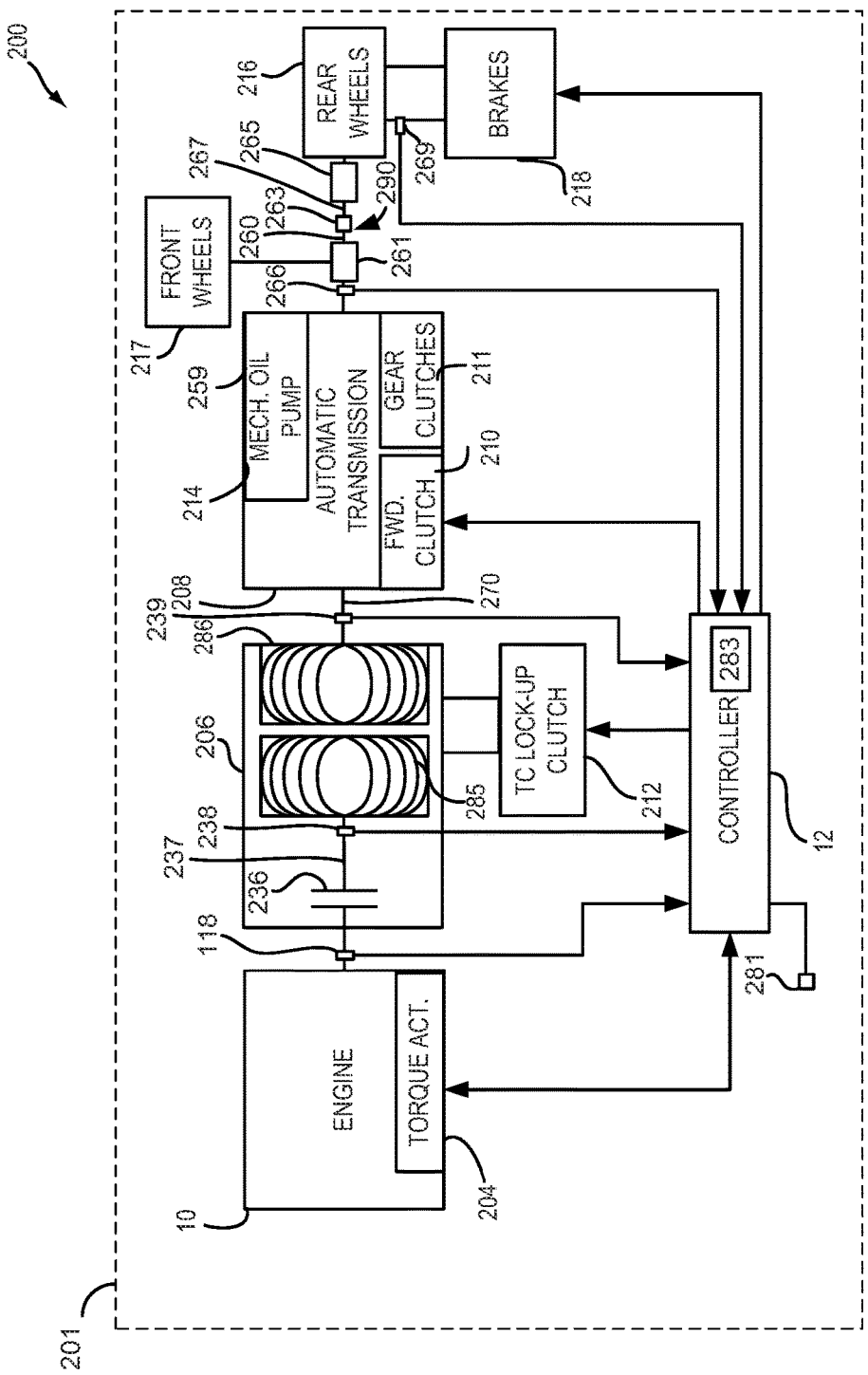

FIG. 2 is a block diagram of a vehicle 201 and vehicle driveline 200. Driveline 200 may be powered by engine 10. Engine 10 may be started with the starter motor shown in FIG. 1. Further, engine 10 may generate or adjust torque via torque actuator 204, such as a fuel injector, throttle, etc.

An engine output torque may be transmitted to an input side of disconnect clutch 236. Engine torque is not transmitted through driveline 200 when disconnect clutch 236 is fully open. Engine torque is transmitted to transmission input shaft 270 when disconnect clutch 236 is fully closed. A portion of engine torque may be transmitted through driveline 200 when disconnect clutch 236 is at least partially closed. Disconnect clutch 236 may be electrically or hydraulically actuated and is shown as part of torque converter 206. However, in some examples, disconnect clutch 236 may be separate from torque converter 206. Engine position sensor 118 measures speed at the input side of disconnect clutch 236. Position sensor 238 senses speed at the output side of disconnect clutch 236. Driveline speed sensor output may be selectively filtered via hardware band pass filter 283. Alternatively, driveline speed sensor output may be band pass filtered via software. The band pass filter upper and lower cut-off frequencies are set to allow driveline natural resonance frequencies to pass through the band pass filter and to attenuate frequencies above and below the driveline natural resonance frequencies.

The downstream side of disconnect clutch 236 is mechanically coupled to the impeller 285 of torque converter 206 via shaft 237. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the transmission torque converter lockup clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via a first half 260 of an output shaft 290. Transmission output speed may be determined via speed sensor 266. A universal joint 263 is positioned between first half 260 of the output shaft 290 and second half 267 of output shaft 290. Second half 267 of output shaft 290 is coupled to differential 265. Engine torque is supplied to rear wheels 216 via differential 265, and wheel speed sensor 269 provides an indication of wheel position and speed. Engine torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (150 in FIG. 1). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine, for example. Thus, the hydraulic pressure 2 0 generated in mechanical oil pump 214 may increase as an engine speed increases, and may decrease as an engine speed decreases.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. Engine control may be performed on a cylinder-by-cylinder basis to control the engine torque output.

When idle-stop conditions are satisfied, controller 42 may initiate engine shutdown by shutting off fuel and spark to the engine. Further, to maintain an amount of torsion in the transmission, the controller 12 may ground rotating elements of transmission 208 to a case 259 of the transmission, and thereby, to the frame of the vehicle. When engine restart conditions are satisfied, and/or a vehicle operator wants to launch the vehicle, controller 12 may reactivate the engine by resuming combustion in engine cylinders.

Thus, the method of FIG. 2 provides for a vehicle system, comprising: an engine; a driveline disconnect clutch coupled to the engine; a motor/generator coupled to the driveline disconnect clutch; a plurality of driveline speed sensors; a torque converter coupled to the motor/generator; a transmission coupled to the torque converter; and a controller including executable instructions stored in non-transitory memory, the executable instructions providing for selecting a driveline speed sensor from the plurality of driveline speed sensors in response to driveline conditions, band pass filtering output of the selected driveline speed sensor, and reducing driveline speed oscillations via the motor/generator or a clutch.

Additionally, the vehicle system includes where the clutch is the driveline disconnect clutch. The vehicle system includes where the clutch is a lockup clutch of the torque converter. The vehicle system includes where the plurality of driveline speed sensors includes wheel speed sensors, a turbine speed sensor, and a transmission output speed sensor. The vehicle system includes where selection of the driveline speed sensor is based on slippage of a clutch.

Figure 3:
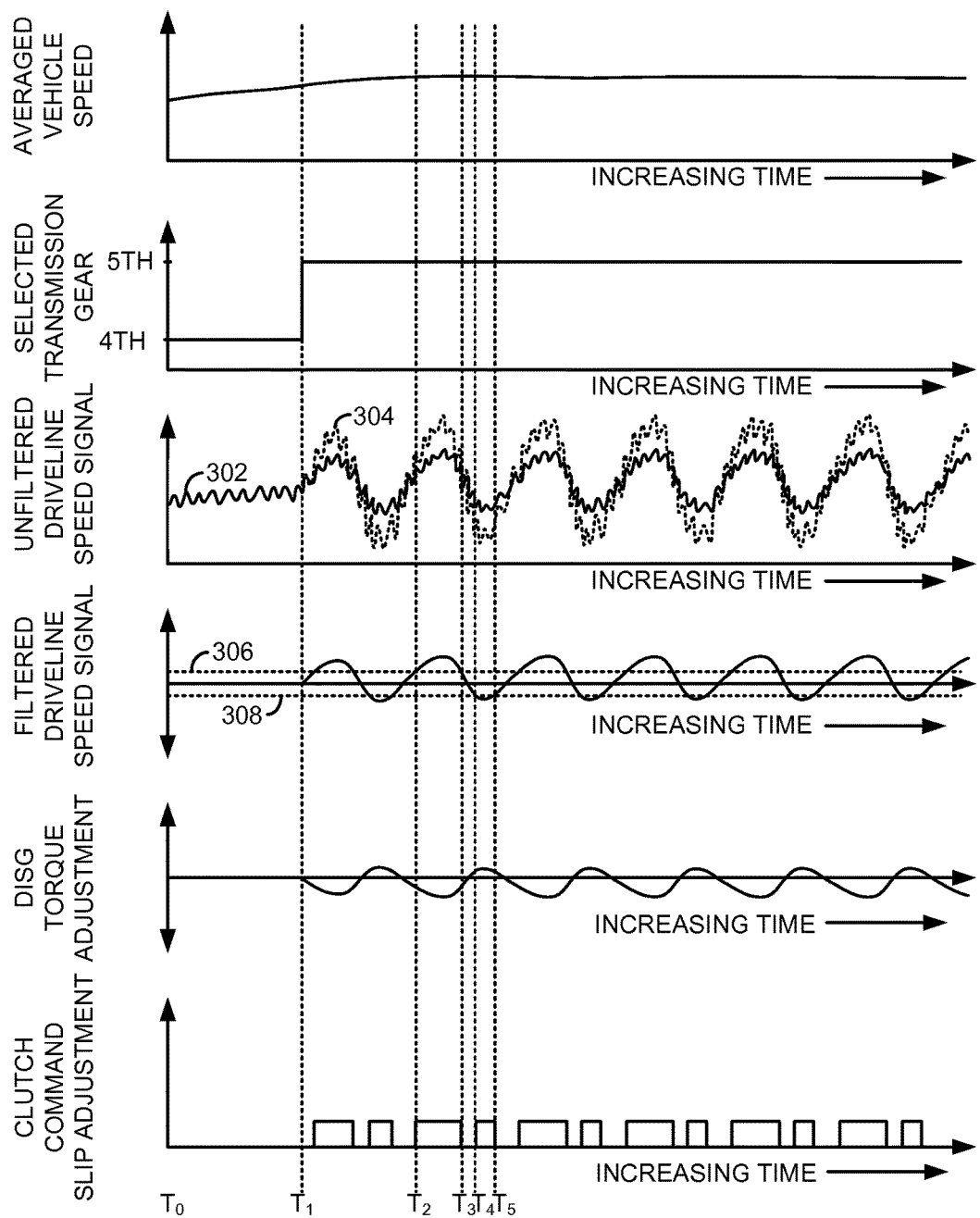

Referring now to FIG. 3, a prophetic example of a vehicle driveline operating sequence is shown. The example sequence may be provided by the method of FIG. 4 in the system shown in FIGS. 1 and 2. Vertical markers $T_0$-$T_5$ represent times of interest for the sequence. Each of the plots is referenced to the same time period as the other plots in the sequence.

The first plot from the top of FIG. 3 is a plot of average vehicle speed versus time. The Y axis represents vehicle speed and vehicle speed increases in the direction of the Y axis arrow. The X axis represents time and time increase from the left hand side of the figure to the right hand side of the figure.

The second plot from the top of FIG. 3 is a plot of selected transmission gear for the vehicle versus time. The Y axis represents transmission gear and $4^{th}$ and $5^{th}$ gear positions are indicated along the Y axis. The X axis represents time and time increase from the left hand side of the figure to the right hand side of the figure.

The third plot from the top of FIG. 3 is a plot of unfiltered driveline speed versus time. The Y axis represents driveline speed and driveline speed increases in the direction of the Y axis arrow. The X axis represents time and time increase from the left hand side of the figure to the right hand side of the figure. Solid trace 302 represents unfiltered driveline speed when clutch slip and/or DISG torque is provided to reduce driveline speed oscillations. Dash trace 304 represents unfiltered driveline speed when clutch slip and/or DISG torque is not provided to reduce driveline speed oscillations.

The fourth plot from the top of FIG. 3 is a plot of band pass filtered driveline speed versus time. The Y axis represents filtered driveline speed based on unfiltered driveline speed shown in the third plot from the top of FIG. 3, and vehicle speed increases in the direction of the Y axis arrow. The X axis represents time and time increase from the left hand side of the figure to the right hand side of the figure. Vertical threshold 306 is an upper driveline speed oscillation threshold above which the DISG torque and/or clutch slip is used to reduce driveline speed oscillations. Vertical threshold 308 is a lower driveline speed oscillation threshold below which the DISG torque and/or clutch slip is used to reduce driveline speed oscillations.

The fifth plot from the top of FIG. 3 is a plot of driveline integrated starter/generator torque adjustment to compensate for driveline oscillations that are related to the drive shafts and the U-joint. The Y axis represents the torque adjustment and the torque adjustment increases positively in the direction of the Y axis arrow above the X axis. The torque adjustment increases negatively in the direction of the Y axis arrow below the X axis. The X axis represents time and time increase from the left hand side of the figure to the right hand side of the figure.

The sixth plot from the top of FIG. 3 is a plot of a clutch slippage or engagement control command versus time. The Y axis represents clutch command slippage or engagement. Clutch slippage is zero and the clutch is fully engaged when the clutch command is at the level of the X axis. Clutch slippage or disengagement increases in the direction of the Y axis arrow. The X axis represents time and time increase from the left hand side of the figure to the right hand side of the figure. The clutch command may be applied to a driveline disconnect clutch, a torque converter bypass clutch, or a forward transmission clutch to reduce driveline oscillations.

At time $T_0$, the average vehicle speed is increasing and the transmission is in $4^{th}$ gear. The unfiltered driveline speed signal includes some high frequency noise that is not related to the driveline natural resonance frequency. The band pass filtered driveline speed signal is at a low level indicating that the driveline is not operating at the driveline natural resonance frequency. The DISG torque adjustment for operating at the driveline resonance frequency is zero in response to the filtered driveline speed signal. The clutch command slip adjustment is zero in response to the filtered driveline speed signal.

At time $T_1$, average vehicle speed has increased to a value where the transmission is shifted from fourth gear to fifth gear in response to vehicle speed. The unfiltered driveline speed signal now begins to oscillate at a lower frequency and it now includes low and high frequency components. The unfiltered driveline frequency without clutch or DISG compensation based on filtered driveline frequency 304 is oscillating between greater upper and lower driveline speeds than the unfiltered driveline frequency with clutch and/or DISG compensation based on filtered driveline frequency 302. The band pass filtered driveline speed signal begins to show the lower frequency oscillation. The DISG begins to adjust torque in an oscillating manner to reduce the driveline speed oscillations in response to the filtered driveline speed signal. The clutch command begins to selectively increase clutch slip in response to the band pass filtered driveline speed.

Thus, it can be observed that the driveline speed oscillations may be dampened via applying a negative DISG torque adjustment when driveline speed is increasing and applying a positive DISG torque adjustment when driveline speed is decreasing. Further, clutch slip may be increased in response to filtered driveline speed exceeding threshold 306 or threshold 308.

For example, at time $T_2$, the clutch is commanded to increase clutch slip in response to the filtered driveline speed signal exceeding speed threshold 306. At time $T_3$, the clutch is commanded to decrease clutch slip in response to the filtered driveline speed signal being less than the driveline speed threshold 306. At time $T_4$, the clutch is again commanded to increase slip in response to the filtered driveline speed signal exceeding lower speed threshold 308. At time $T_5$, the clutch is commanded to decrease slip in response to the filtered driveline speed signal varying less than lower speed threshold 308. Between time $T_1$ and the end of the sequence, the DISG torque is adjusted out of phase from the speed signal so as to reduce the driveline speed oscillations. However, during some conditions, the clutch slip may be adjusted without the DISG torque being adjusted and vice-versa in response to filtered driveline speed. Additionally, the vehicle speed remains relatively constant and the transmission remains in $5^{th}$ gear.

Figure 4:
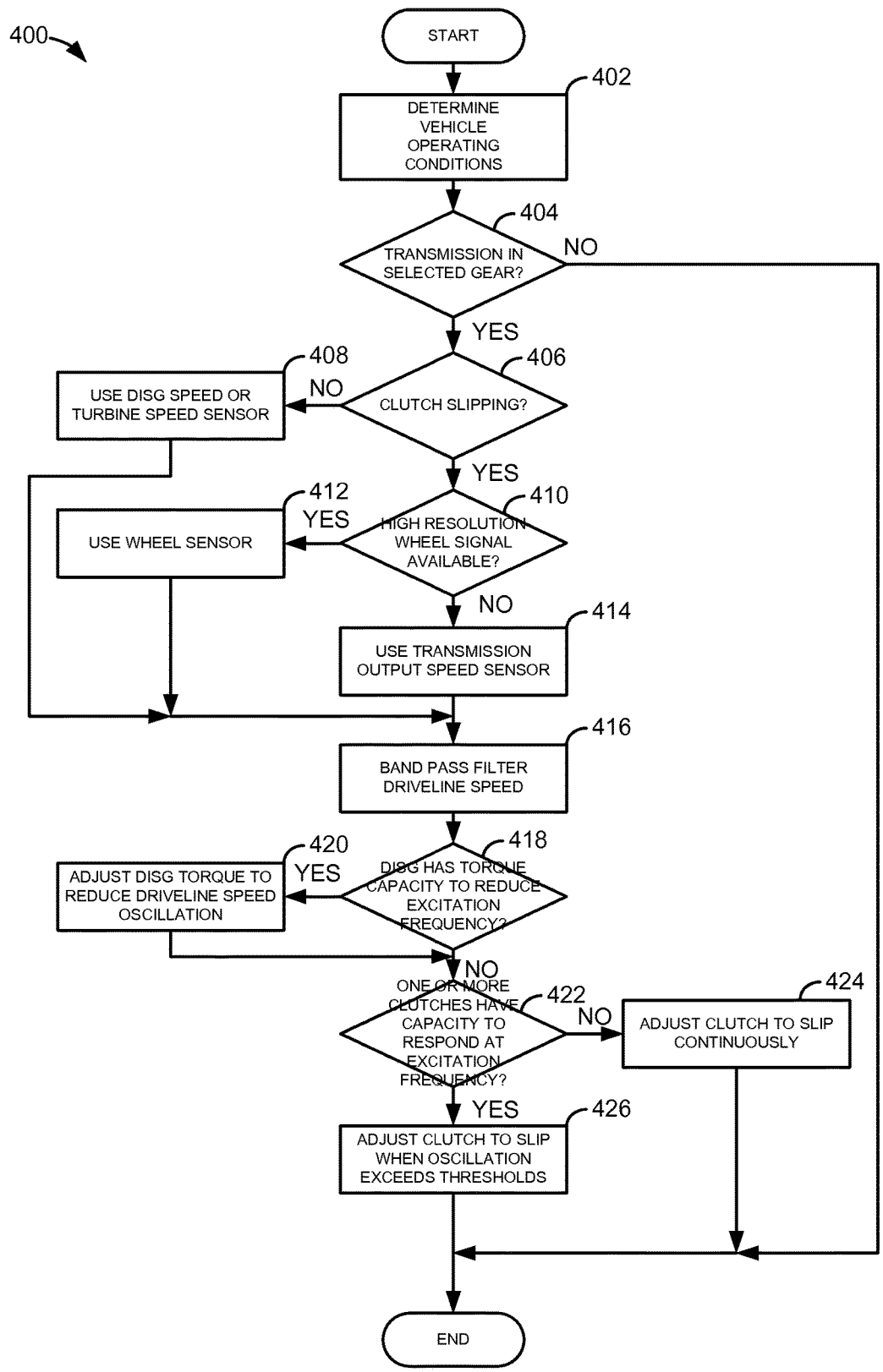

Referring now to FIG. 4, a method for compensating driveline resonance oscillations is shown. The method of FIG. 4 may provide the sequence of FIG. 3 when applied in a system as is shown in FIGS. 1 and 2.

At 402, method 400 determines vehicle operating conditions. Vehicle operating conditions may include but are not limited to vehicle speed, driveline speeds at various locations in a driveline, selected transmission gear, band pass filtered driveline speed, DISG torque output, DISG torque output capacity, and driveline clutch state(s) (e.g., torque converter clutch state, driveline clutch state, and gear or forward clutch state). Method 400 proceeds to 404 after vehicle operating conditions are determined.

At 404, method 400 judges whether or not the transmission is in a predetermined selected gear (e.g., $4^{th}$, $5^{th}$, or $6^{th}$ gear). Further, in some examples, method judges whether or not vehicle speed is within a predetermined vehicle speed range while in the selected gear. If method 400 judges that the transmission is in the selected gear and/or vehicle speed range, the answer is yes and method 400 proceeds to 406. Otherwise, the answer is no and method 400 proceeds to exit. The predetermined gear and vehicle speed may be in ranges where the driveline's natural resonance frequency is present or is susceptible to being excited.

At 406, method 400 judges whether or not a transmission clutch is slipping. The transmission clutch may be a torque converter clutch, driveline clutch, gear clutch, or forward clutch. Clutch slippage may be determined via a difference in clutch input and output speeds. If method 400 judges that clutch slippage is present, the answer is yes and method 400 proceeds to 410. Otherwise, the answer is no and method 400 proceeds to 408.

At 408, method 400 selects either output of a DISG speed sensor or output of a torque converter turbine speed sensor for determining and band pass filtering driveline speed. The DISG and turbine speed sensors provide high resolution driveline speed signals. Therefore, the DISG and turbine speed sensors may provide a more accurate representation of driveline speed and driveline resonance frequencies after band pass filtering. When one or more of the driveline clutches are slipping, the DISG and turbine speeds may not reflect driveline speed at the U-joint and driveshaft halves. Therefore, the DISG and turbine speeds are not the basis for determining filtered driveline speed when driveline clutch slippage is determined. Method 400 proceeds to 416 after either output from the DISG or turbine speed sensor is selected to determine driveline speed and provide the basis for filtered driveline speed.

At 410, method 400 judges whether or not high resolution wheel speed signal is available. In one example, the high speed wheel signal may not be available for wheel speeds greater than a threshold speed or if the wheel speed signal may not be transmitted from one controller to another controller. If the high resolution wheel speed signal is available the answer is yes and method 400 proceeds to 412. Otherwise, the answer is no and method 400 proceeds to 414.

At 412, method 400 selects the wheel speed sensor as the basis for determining driveline speed. In one example, the wheel speed signal adjusted based on the axle ratio and is then band pass filtered to determine the filtered driveline speed. Method 400 proceeds to 416 after the wheel speed sensor is selected as the basis for determining driveline speed.

At 414, method 400 selects the transmission output speed sensor as a basis for determining band pass filtered driveline speed. The transmission output speed may be selected as the basis for determining band pass filtered driveline speed when other speed sensor outputs are not available or are not representative of driveline speed. Although transmission output speed may be a lower resolution signal than turbine speed or wheel speed, it may be used to determine band pass filtered driveline speed. Method 400 proceeds to 416 after the transmission output speed sensor is selected as the basis for determining band pass filtered driveline speed.

At 416, method 400 band pass filters the unfiltered driveline speed signal from the selected speed sensor. The driveline speed signal from the selected speed sensor may be band pass filtered via a hardware filter or a software filter. The filter's pass band is set to capture the driveline's natural resonance frequency. Method 400 proceeds to 418 after the driveline speed is band pass filtered.

At 418, method 400 judges whether or not the DISG has sufficient torque capacity to reduce driveline speed oscillations that are the result of the driveline's natural resonance frequency. In one example, the DISG's torque capacity is judged based on the total torque capacity of the DISG at present operating conditions, the torque being output or absorbed by the DISG, and the amount of torque to compensate for the driveline speed oscillations.

In one example, the amount of torque to compensate for driveline speed oscillations is determined via the equation:

$$T = j\dot{\omega}$$

Where T is a torque the DISG supplies to compensate or reduce the driveline speed oscillation, j is the driveline inertia, and $\dot{\omega}$ is the angular acceleration of the band pass filtered driveline speed as determined from the driveline speed sensor. The DISG torque is also adjusted for transmission gear ratio.

The DISG may be determined to have sufficient torque capacity based on whether or not the remainder of the DISG's total torque capacity minus the DISG's present torque output or absorbing torque is greater than the amount of torque to compensate for driveline speed oscillations. If the DISG has sufficient reserve torque available to attenuate the driveline speed variations that are at the driveline's resonance frequency by a predetermined amount, the answer is yes and method 400 proceeds to 420. Otherwise, the answer is no and method 400 proceeds to 422.

At 420, method 400 adjusts DISG torque to reduce driveline speed oscillations that are at the driveline's resonance frequency. In one example, the DISG output torque is commanded to adjust DISG output torque by a value of −T where T is determined from: $T = j\dot{\omega}$, and where $\dot{\omega}$ is determined real time from band pass filtered driveline speed. Thus, DISG output torque may be adjusted to reduce driveline oscillations. Method 400 proceeds to 422 after DISG torque is adjusted.

At 422, method 400 judges whether or not one or more driveline clutches have the capacity to respond to increase and decrease clutch slip twice during driveline speed oscillations. For example, if the driveline resonance frequency is at X cycles/second, the clutch may need to respond at four times X cycles/second. The frequency response of each clutch may be stored in memory and compared to the driveline resonance frequency.

Further, if more than one clutch has the capacity to increase and decrease slip at a desired rate, method 400 selects a clutch based on driveline operating conditions. For example, if the engine is not rotating to conserve fuel, the torque converter clutch or forward clutch may be selected. On the other hand, if the torque converter clutch is locked to reduce heating the transmission oil, the driveline disconnect clutch may be commanded to slip in response to band pass filtered driveline speed. If method 400 determines that one or more driveline clutch has capacity to respond to the band pass filtered driveline speed, the answer is yes and method 400 proceeds to 426. Otherwise, the answer is no and method 400 proceeds to 424.

At 424, method 400 adjusts the clutch to slip continuously as the driveline rotates. For example, method 400 may reduce the clutch application force by an amount that causes 50 RPM slip across the clutch while the band pass driveline speed is indicating driveline speed oscillations at the driveline resonance frequency. Method 400 proceeds to exit after the clutch slip is adjusted.

At 426, method 400 adjusts the clutch to slip when band pass filtered driveline speed exceeds an upper or lower threshold speed. For example, as shown in FIG. 3, if band pass filtered driveline speed is greater than an upper speed threshold, the clutch is commanded to slip. If band pass filtered driveline speed declines to less than the upper speed threshold and greater than the lower speed threshold, clutch slip is reduced. Thus, the clutch slip, or amount of torque that may be transferred via the clutch, may be increased and decreased several times during a cycle of the band pass filtered driveline speed signal to reduce driveline speed oscillations.

Further, the clutch application force and/or the clutch slip may be adjusted responsive to the capacity the DISG has of reducing driveline speed oscillations to a desired level. For example, if the DISG has the capacity to reduce driveline speed oscillations to a desired level, the clutch slip may not be increased. However, if the DISG has the capacity to reduce driveline speed by only 75% of a desired amount, the clutch slip may be increased by 10% when the clutch is commanded to slip. If the DISG is not providing torque to or from the driveline due to a state of battery charge, the clutch slip may be increased to 35% when the clutch is commanded to slip. Method 400 proceeds to exit after clutch slip has been adjusted.

In this way, DISG and/or clutch torque may be adjusted to reduce driveline resonance based oscillations. Further, the DISG torque and clutch slip adjustments may be based on band pass filtered driveline speed rather than simply when the driveline reaches a specific speed. Such compensation may reduce fuel consumption and the possibility of driveline component degradation.

The method of FIG. 4 provides for a driveline operating method, comprising: adjusting torque of a generator in a driveline in response to a band pass filtered driveline speed in a first mode; and adjusting slip of a clutch in the driveline in response to the band pass filtered driveline speed in a second mode in response to a generator condition. The first and second modes may occur at different times, such that they do not occur at the same time. The driveline operating method may include the clutch being a forward clutch of a transmission.

In some examples, the driveline operating method includes where the clutch is a torque converter bypass clutch. The driveline operating method includes where a negative torque of the generator is increased in response to an increase in the band pass filtered driveline speed. The driveline operating method includes where a positive torque of the generator is increased in response to a decrease in the band pass filtered driveline speed. The driveline operating method includes where adjusting slip of the clutch in response to the band pass filtered driveline speed is performed only when a transmission in the driveline is in a predetermined gear. The driveline operating method includes where adjusting torque of the generator in response to the band pass filtered driveline speed is performed only when a transmission in the driveline is in a predetermined gear. The driveline operating method includes where the band pass filtered driveline speed is filtered at a frequency based on a driveline resonance frequency, the driveline resonance frequency based on a driveline including a U-joint positioned between two driveshaft halves.

In another example, the method of FIG. 4 provides for a driveline operating method, comprising: adjusting torque of a generator in a driveline in response to a band pass filtered driveline speed in a first mode; and increasing slip of a clutch in the driveline in response to the band pass filtered driveline speed exceeding first and second threshold speeds in a second mode in response to a generator condition. The driveline operating method further comprises decreasing slip of the clutch in the driveline in response to the band pass filtered driveline speed not exceeding the first and second thresholds, the first threshold a positive speed, the second threshold a negative speed. The driveline operating method includes where the clutch is a driveline disconnect clutch positioned in the driveline between the generator and an engine. The driveline operating method includes where the generator condition is the generator not consuming or generating electrical energy.

Additionally, the driveline operating method includes where the generator condition is the generator lacking torque to reduce driveline speed oscillations by more than a threshold amount of speed. The driveline operating method further comprises selecting speed sensors at different driveline locations at times to provide the band pass filtered driveline speed. The driveline operating method includes where the band pass filtered driveline speed is filtered at a frequency based on a driveline resonance frequency, the driveline resonance frequency based on a driveline including a U-joint positioned between two driveshaft halves.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
receiving sensor inputs to a controller;
increasing slip of a clutch in a driveline via the controller in response to a band pass filtered driveline speed exceeding first and second threshold speeds, and
adjusting slip of the clutch when the clutch has capacity to adjust slip at a rate of driveline resonance frequency multiplied by a value of four during driveline speed oscillations, and slipping the clutch continuously when the clutch does not have capacity to adjust slip at the rate of driveline resonance frequency multiplied by the value of four during driveline speed oscillations.

2. The driveline operating method of claim 1, further comprising decreasing slip of the clutch in the driveline in response to the band pass filtered driveline speed not exceeding the first and second threshold speeds, the first threshold speed a positive speed, the second threshold speed a negative speed.

3. The driveline operating method of claim 1, where the clutch is a driveline disconnect clutch positioned in the driveline between a transmission and an engine.

4. The driveline operating method of claim 3, further comprising adjusting torque of a driveline integrated starter/generator in response to a torque capacity of the driveline integrated starter/generator minus a present torque output of the driveline integrated starter/generator being greater than a torque to compensate driveline speed oscillations.

5. The driveline operating method of claim 1, further comprising selecting a wheel speed sensor at a first location to provide the band pass filtered driveline speed in response to the wheel speed sensor being available, and selecting a second speed sensor at a second location to provide the band pass filtered driveline speed in response to the wheel speed sensor being unavailable.

6. The driveline operating method of claim 1, where the band pass filtered driveline speed is filtered at a frequency based on a driveline resonance frequency, the driveline resonance frequency based on the driveline including a U-joint positioned between two driveshaft halves.

7. The driveline operating method of claim 1, where the clutch is a lockup clutch of a torque converter.

8. The driveline operating method of claim 1, where increasing slip is provided when driveline speed is oscillating.

9. The driveline operating method of claim 1, further comprising increasing slip of the clutch in response to a vehicle speed being in a range where a natural resonance frequency of the driveline is present.

10. The driveline operating method of claim 1, where the band pass filtered driveline speed is filtered via a band pass filter set to capture a natural frequency of the driveline.

* * * * *